(12) United States Patent
Park et al.

(10) Patent No.: US 7,356,363 B2
(45) Date of Patent: Apr. 8, 2008

(54) SLIDE TYPE MOBILE COMMUNICATION TERMINAL CAPABLE OF MOUNTING MEMORY CARD

(75) Inventors: Book S. Park, Seoul (KR); Jin M. Jang, Seoul (KR); Seon G. Lee, Gyounggi-Do (KR)

(73) Assignee: Curitel Communications, Inc., Seoul (KR)

( * ) Notice: Subject to any disclaimer, the term of this patent is extended or adjusted under 35 U.S.C. 154(b) by 422 days.

(21) Appl. No.: 11/063,580

(22) Filed: Feb. 24, 2005

(65) Prior Publication Data

US 2005/0208985 A1    Sep. 22, 2005

(30) Foreign Application Priority Data

Mar. 4, 2004    (KR) ..................... 10-2004-0014475

(51) Int. Cl.
*H04B 1/38*    (2006.01)

(52) U.S. Cl. ................. 455/575.4; 455/575.1; 455/90.3; 455/557; 439/630; 439/687; 439/696

(58) Field of Classification Search ............. 455/556.1, 455/557, 558, 575.1, 575.4, 90.3; 439/630, 439/687, 696

See application file for complete search history.

(56) References Cited

U.S. PATENT DOCUMENTS

| | | | | |
|---|---|---|---|---|
| 5,863,213 A | * | 1/1999 | Enomoto et al. | 439/326 |
| 6,386,920 B1 | * | 5/2002 | Sun | 439/630 |
| 2003/0016487 A1 | * | 1/2003 | Tung-Chieh et al. | 361/679 |

FOREIGN PATENT DOCUMENTS

KR    10-0360901    10/2002

* cited by examiner

*Primary Examiner*—Matthew Anderson
*Assistant Examiner*—Tuan Pham
(74) *Attorney, Agent, or Firm*—Dickstein Shapiro LLP

(57) ABSTRACT

Disclosed is a slide-type mobile communication terminal capable of mounting a memory card, wherein the memory card can be easily mounted/detached and a mounted state of the memory card can be stably maintained while minimizing a thickness increase of the terminal due to the mount of the memory card, by forming a receiving recess for mounting the memory card on a rear surface of a slide cover.

6 Claims, 9 Drawing Sheets

SLIDE TYPE MOBILE COMMUNICATION TERMINAL CAPABLE OF MOUNTING MEMORY CARD

CROSS-REFERENCE TO RELATED APPLICATION

The present application is claiming priority of Korean Patent Application No. 10-2004-0014475, filed on Mar. 4, 2004, the content of which is herein incorporated by reference.

BACKGROUND OF THE INVENTION

1. Field of the Invention

The present invention relates to a slide-type mobile communication terminal capable of mounting an memory card, wherein the memory card can be easily mounted/detached and a mounted state of the memory card can be stably maintained with minimizing an increase in the mobile communication terminal's thickness due to the mount of the memory card, by providing a structure capable of mounting the memory card to a rear surface of slide cover composing the mobile communication terminal.

2. Description of the Related Art

Since a mobile communication terminal (also referred as "terminal" hereinafter) such as a cellular phone or a PDA (Personal Digital Assistant) terminal pursues a handset having multi-functions, considering a VOD (Video On Demand) or MPEG function, a problem of a memory capacity is on the rise.

Like this, in order to supplying an insufficient memory of the terminal, an memory card has been used. The memory card is a very inexpensive storage device and communication media, which is commonly used all over the world. It is designed to use in various machines such as an electronic toy, an electronic organizer, a PDA terminal, a digital camera, a smart phone, a digital recorder, a MP3 player and a pager, etc. as well as a cellular phone. In addition, the memory card has an excellent performance for its convenience of carrying and cost. Additionally, it has advantages of low power consumption and a rapid data processing using a memory card interface.

Many kinds of memory cards such as mini, super-slim and stick types are currently used. Such memory cards correspond to bridge media capable of moving between different devices. One of important characteristics of memory card is a convenient handling. Miniaturization and multi-functions of the memory card are absolutely required to embody a compact hardware and a multi-function handset and very important for a generation of a new era digital device (hardware). In addition, the memory card should be designed to easily use it, from a user interface point of view.

The current memory card has been developed to have a size of a stamp and to have a form such that anybody can use it easily. In addition, it has a high generality of recordable data, so that it can be used in various devices from an AVC (Advanced Video Coding) to an electric home appliance.

However, when the memory card is mounted to a slide-type mobile communication terminal, there are problems that not only the terminal increases in volume but mount/detach of the memory card are inconvenient.

The slide-type mobile communication terminal has a structure that a slide cover is moved slidingly against a main body, while a hinged (or folder) type mobile communication terminal has a structure that a cover is pivoted to be opened/closed for a main body.

In such a slide-type mobile communication terminal, typically, key buttons are formed on the main body and its slide cover is provided with a large LCD screen. Accordingly, even while the slide cover is closed, it is possible to use the large LCD screen and various function keys.

In addition, compared to the folder type mobile communication terminal of which cover has LCD screen on both sides of it respectively, a thickness of the slide-type mobile communication terminal is relatively thin because only one LCD screen is provided.

Conventionally, an memory card is mounted to the slide-type mobile communication terminal as follows. That is, the memory card is mounted to a rear part of the main body at which a battery is mounted, or is inserted into a side surface of the main body.

However, according to the former method, the battery should be detached from the main body, in order to mount/detach the memory card. In addition, it is difficult to design the terminal due to a restraint of space, and a thickness of the main body is increased.

The latter is a method of inserting the memory card into a side surface of the terminal main body. However, since the memory card is not completely inserted and partially protrudes to the outside, an external appearance of the terminal is spoiled. In particular, if the terminal falls to the floor under a state that the memory card is inserted, the memory card is apt to be severely damaged.

SUMMARY OF THE INVENTION

Accordingly, the present invention has been made to solve the above-mentioned problems occurring in the prior art. The object of the present invention is to provide a slide-type mobile communication terminal capable of mounting an memory card, wherein the memory card can be easily mounted/detached and a mounted state of the memory card can be stably maintained with minimizing an increase in the mobile communication terminal's thickness due to the mount of the memory card, by providing a structure capable of mounting the memory card to a rear surface of slide cover composing the mobile communication terminal.

In order to accomplish the objects, there is provided a slide-type mobile communication terminal comprising a receiving recess formed on a rear surface of a slide cover so as to mount an memory card; guides guiding an entry of the memory card and preventing the mounted memory card from deviating; and a socket connecting the memory card electronically with a main PCB which is contained in the slide cover.

As described above, according to the invention, the memory card is mounted to the receiving recess formed on the rear surface of the slide cover. Accordingly, the receiving recess and the memory card mounted therein are exposed to the outside simply by pushing-up the slide cover against the main body.

Accordingly, it is possible to easily mount/detach the memory card compared to the prior method that demands battery detaching from terminal's main body for mounting/detaching of the memory card of necessities, and to form the receiving recess for mounting the memory card without increasing the thickness of the slide cover.

Meanwhile, it is preferred that the receiving recess is formed on a rear surface of the slide cover, which is exposed to the outside without facing the main body in state that the slide cover is entirely pushed-up against the main body.

More preferably, the receiving recess is formed to have a same depth as a thickness of the memory card or more.

According to the invention, the socket may comprise a contact terminal of which one end is connected to the main PCB electronically and the other end is connected to terminal pin of the memory card electronically; a sidewall part supporting one side of the contact terminal; and a ceiling part supporting the upper surface of the contact terminal by extending from the sidewall part toward entrance of the receiving recess.

The contact terminals may comprise a solder pad part soldered on the main PCB; a column part upward extending from one side of the solder pad part and embedded in the sidewall part; and a sliding-contact part contacting with the terminal pins of the memory card by extending from the column part to the entrance of the receiving recess along the ceiling part.

In addition, the socket may further comprise a support part stabilizing the contact between the terminal pin of the memory card and the sliding-contact part of the contact terminal.

According to the invention, the memory card comprises a MINI SD (Mini Secure Digital) card, a SD card, a MMC (Multi Media Card), a SM (Smart Media) card and a Sony memory stick.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
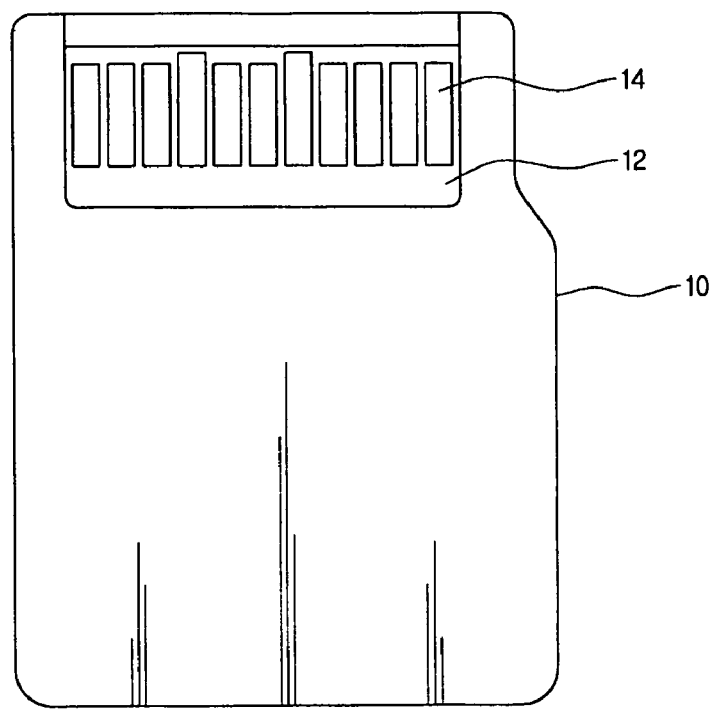
FIG. 1 shows a MINI SD card as an example of a memory card.
Figure 2:
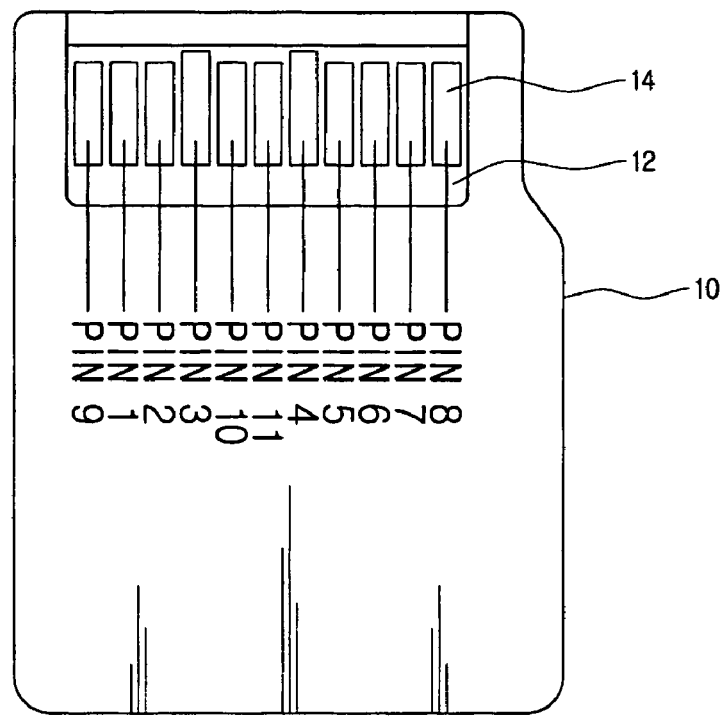
FIG. 2 shows terminal pins of the MINI SD card.

We explain a general structure of a memory card with reference to FIG. 1 and FIG. 2 before specifically describing a slide-type mobile communication terminal of the invention.

Each of FIG. 1 and FIG. 2 shows a MINI SD (Mini Secure Digital) card as an example of external memory card capable of interfacing with a mobile communication terminal.

It should be noted that a SD card, a MMC (Multi Media Card, which has a same use or similar to the SD card), a SM (Smart Media, which can interface with a mobile communication terminal and a MP3 player) card and a Sony memory stick (which can primarily interface with a mobile communication terminal and electronic products available from the Sony corporation), etc. can be applied to the invention in the same manner. Hereinafter, the above-mentioned various memory cards will be commonly referred to as a 'memory card'.

As shown in FIG. 1 and FIG. 2, the memory card 10 is provided with a connection pad 12 having plural terminal pins on one side thereof.

The memory card 10 shown in FIG. 2 comprises 11 terminal pins (PIN 1~PIN 11). The number of the terminal pins may be same as that of the MINI SD card shown in FIG. 2 or different slightly according to kinds of the memory card. In addition, the size thereof may be different more or less according to kinds of the memory card.

The terminal pins 14 have typically functions as shown in a following Table 1, respectively.

TABLE 1

| Pin No. | Name | Function |
| --- | --- | --- |
| PIN 1 | CD/DAT3 | Card Detect, Data I/O |
| PIN 2 | CMD | Command |
| PIN 3 | VSS | Ground |
| PIN 4 | VDD | Supply Voltage |
| PIN 5 | CLK | Clock |
| PIN 6 | VSS | Ground |
| PIN 7 | DAT 0 | Data Line [Bit 0] |
| PIN 8 | DAT 1 | Data Line [Bit 1] |
| PIN 9 | DAT 2 | Data Line [Bit 2] |
| PIN 10 | NC | For Future Use |
| PIN 11 | NC | For Future Use |

Hereinafter, the invention will be now described.

Figure 3:
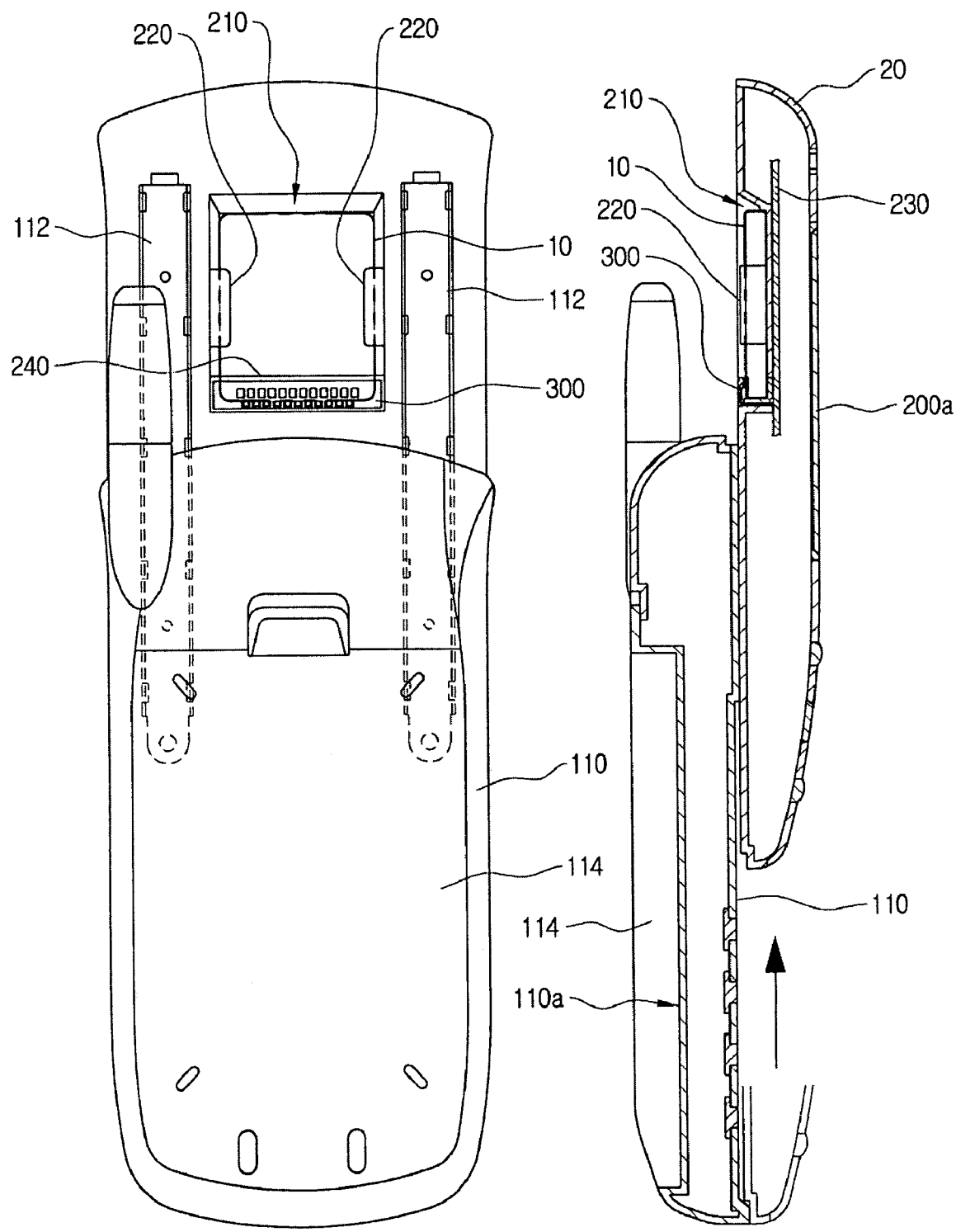
FIG. 3 shows a slide-type mobile communication terminal mounting a memory card.
Figure 4:
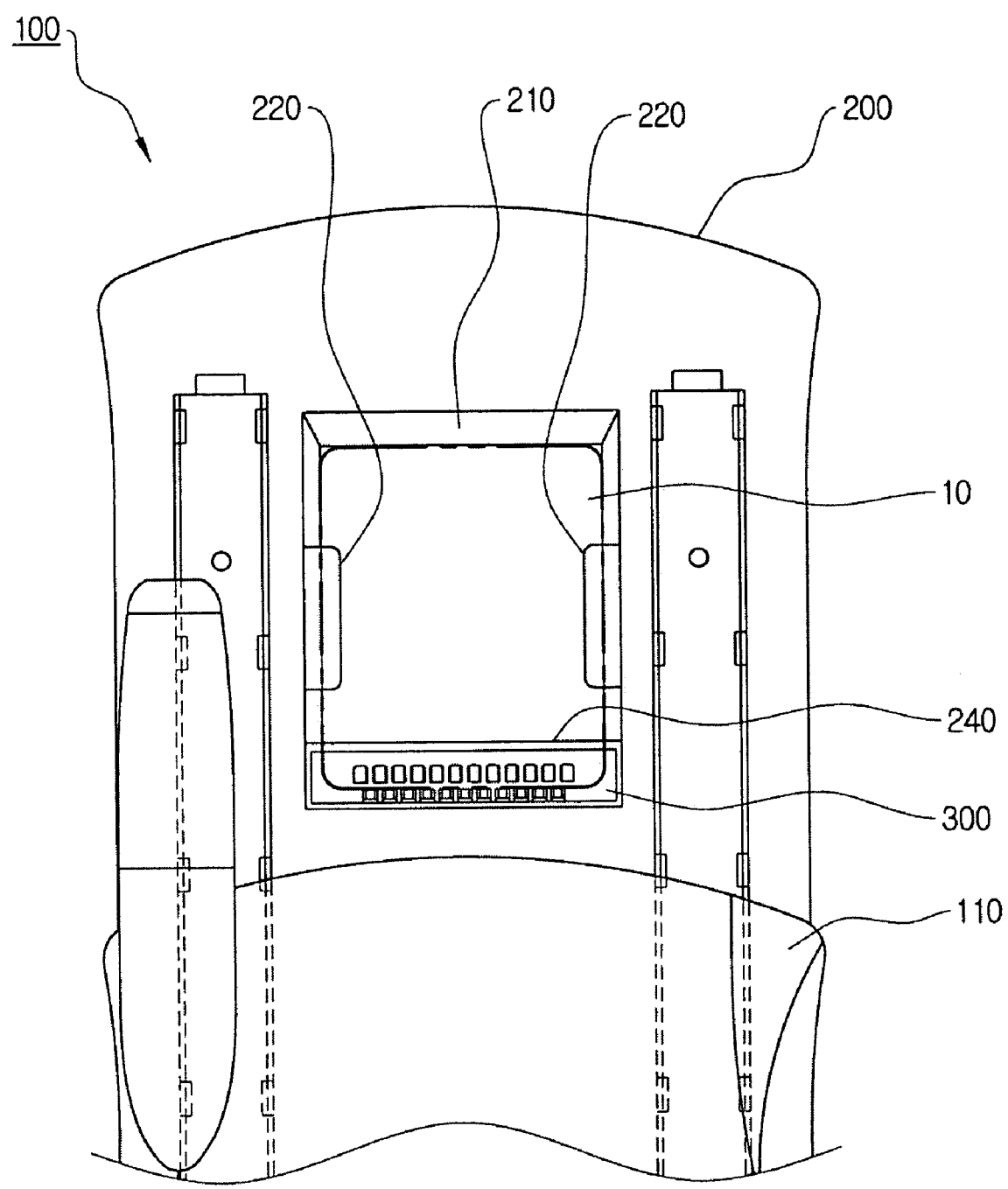
FIG. 4 shows enlarged appearance for the part at which memory card is mounted.
Figure 5:
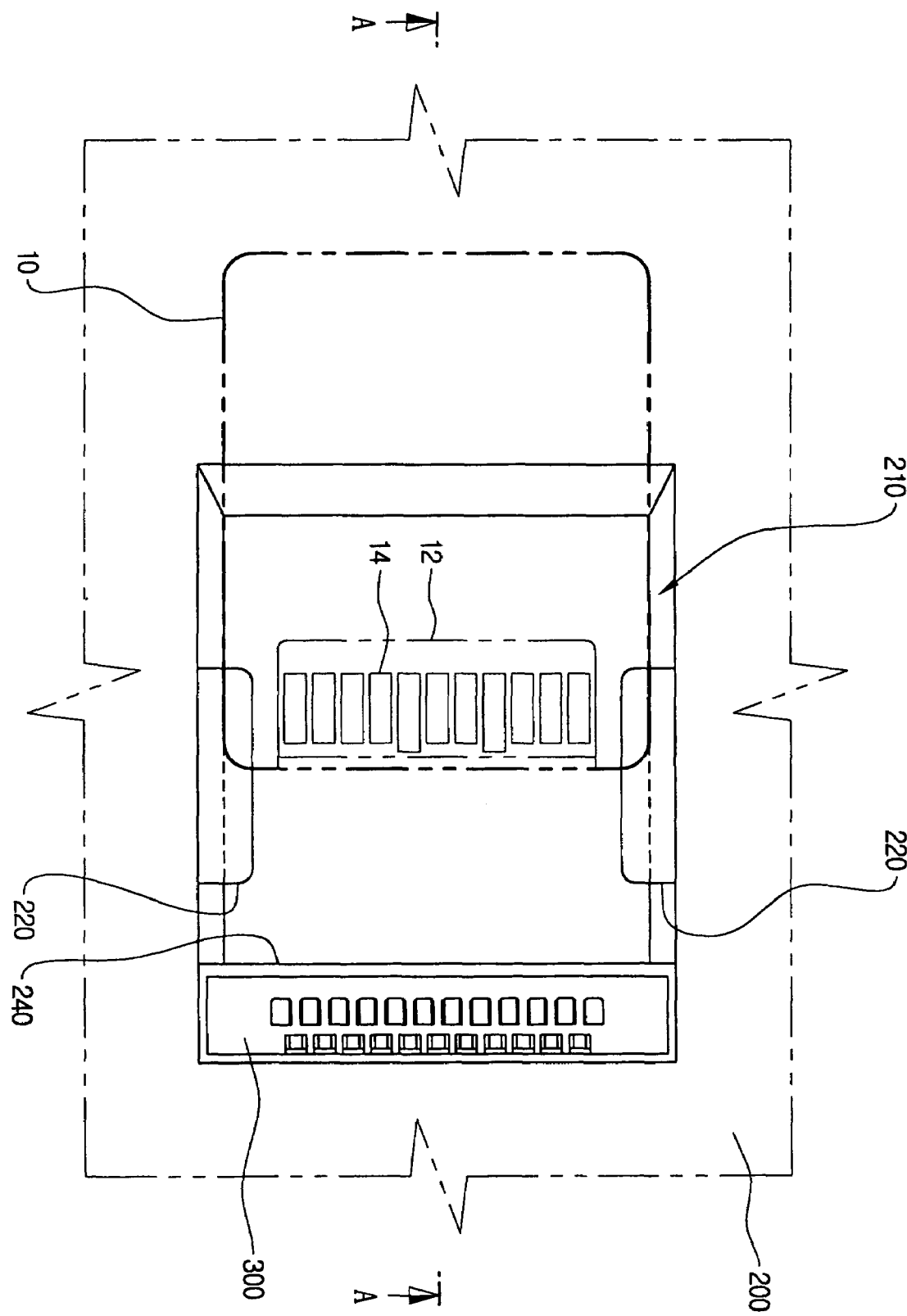
FIG. 5 shows a state that the memory card is advanced into a receiving recess.

FIG. 3 shows a slide-type mobile communication terminal mounting a memory card and FIG. 4 shows enlarged appearance for the part at which the memory card is mounted.

As shown in FIG. 3 and FIG. 4, the invention, particularly, is applied to a slide-type mobile communication terminal 100 having a slide cover 200 combining with a main body 110.

The slide-type mobile communication terminal 100 has a structure that the main body 110 and the slide cover 200 are sliding-movably combined via rails 112. FIG. 3 and FIG. 4 show that the slide cover 200 is entirely pushed-up.

According to the invention, a receiving recess 210 for mounting the memory card is formed in a section of the rear part of the slide cover 200, which section is exposed to the outside without overlapping with the main body 110 in state that the slide cover 200 is entirely pushed-up.

Guides 220 are formed on both sides of the receiving recess 210. The guide 220 guides an entry of the memory card 10 into the receiving recess 210. In addition, the guides 220 support an outer surface of the mounted memory card 10 so as to maintain a stable mounted state of the memory card 10 and to prevent the memory card 10 from deviating from the receiving recess.

According to the invention, a socket 300 is formed on one side of an interior of the receiving recess. More specifically, the socket 300 is provided on a main PCB mounted in the slide cover 200 and protrudes to the outside through an opening part formed in an inner end of the receiving recess.

In addition, plural terminal pins provided to one end of the memory card 10 are electrically connected to the socket 300 shown as in FIG. 3.

According to the prior art, the memory card 10 is inserted into a rear part 110a of the main body 110, on which the battery 114 is mounted. Accordingly, there was an inconvenience that the battery 114 should be detached from the main body 110 in order to mount and detach the memory card 10. In addition, when the memory card 10 is mounted/detached, a user should turn off a power supply of the terminal and again turn on the power after mounting/detaching the memory card.

Additionally, in order to mount the memory card 10 to the part to which the battery is mounted, a thickness of the main body 110 should be increased. However, if the main body 110 is thickened, an external appearance of the terminal is somewhat gross, so that customers will look away from the terminal. Accordingly, the thickness of the battery 114 was obliged to be decreased in order to mount the memory card 10 without thickening the terminal. An electronic capacity of the battery 114, as the result, was forced to be reduced, instead of increasing the thickness of the main body 110.

However, according to the invention, the receiving recess 210 in which the memory card 10 is mounted is formed on the rear surface of the slide cover 200, rather than the main body 110. Meanwhile, a main PCB (Printed Circuit Board) 230 for driving a terminal screen 200a is provided in the slide cover 200. The main PCB 230 consists of a very thin flexible PCB (FPCB) typically.

Accordingly, it is possible to form the receiving recess 210 for mounting the memory card 10 on the rear surface of the slide cover 200 without increasing the thickness of the slide cover.

In addition, it is possible to easily mount/detach the memory card 10 since the receiving recess 210 is exposed to the outside of the main body 110 by pushing-up the sliding cover 200 against the main body 110.

Hereinafter, we describe a method of mounting the memory card to the slide-type mobile communication terminal with reference to accompanying drawings.

Figure 6:
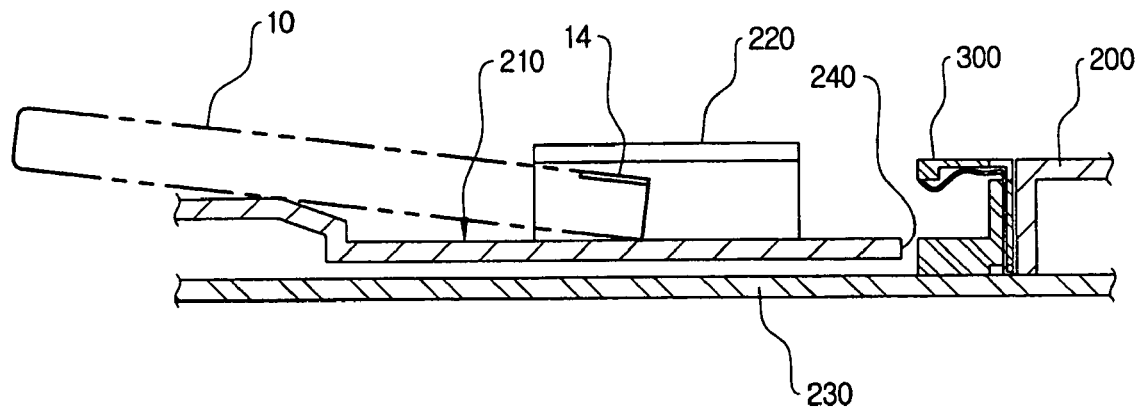
FIG. 6 is a cross-section along a line A-A in FIG. 5.
Figure 7:
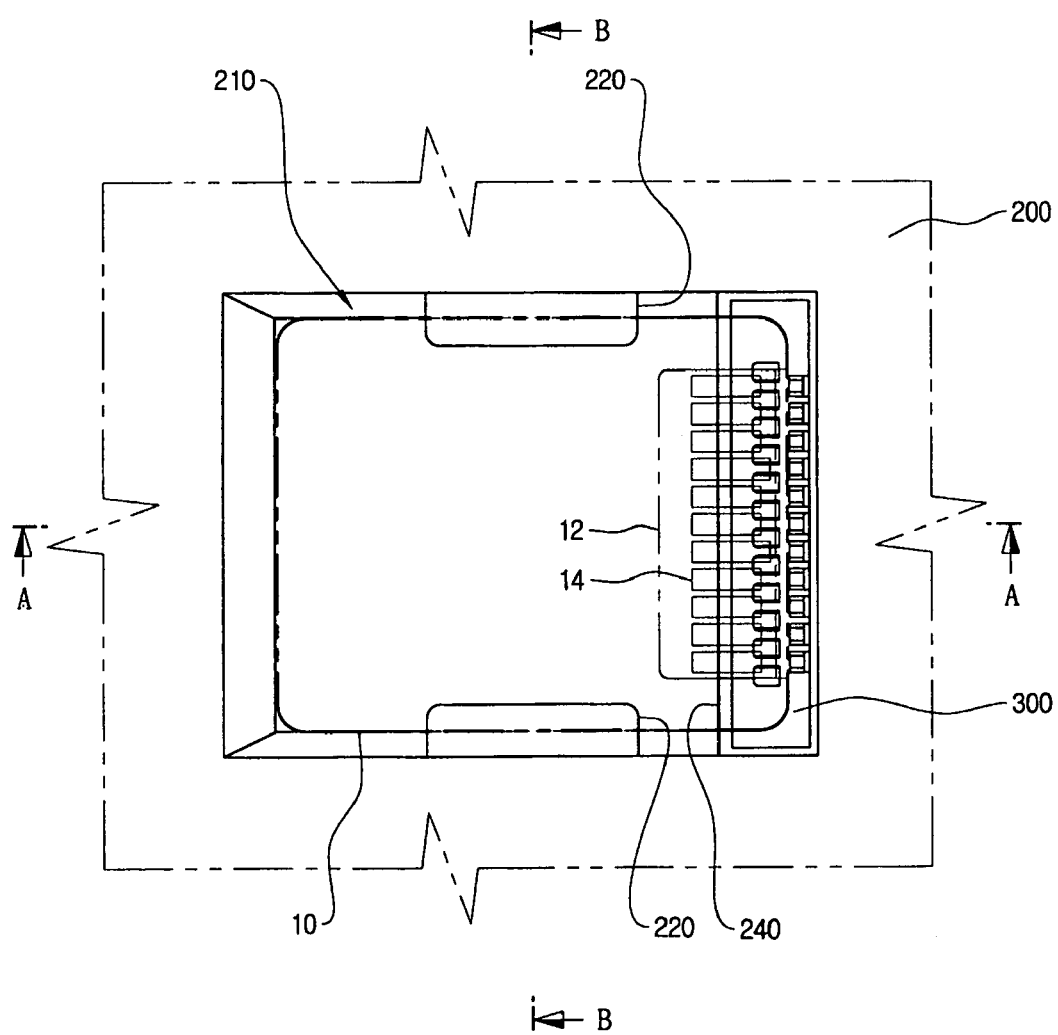
FIG. 7 shows a state that the memory card is completely mounted in a receiving recess.
Figure 8:
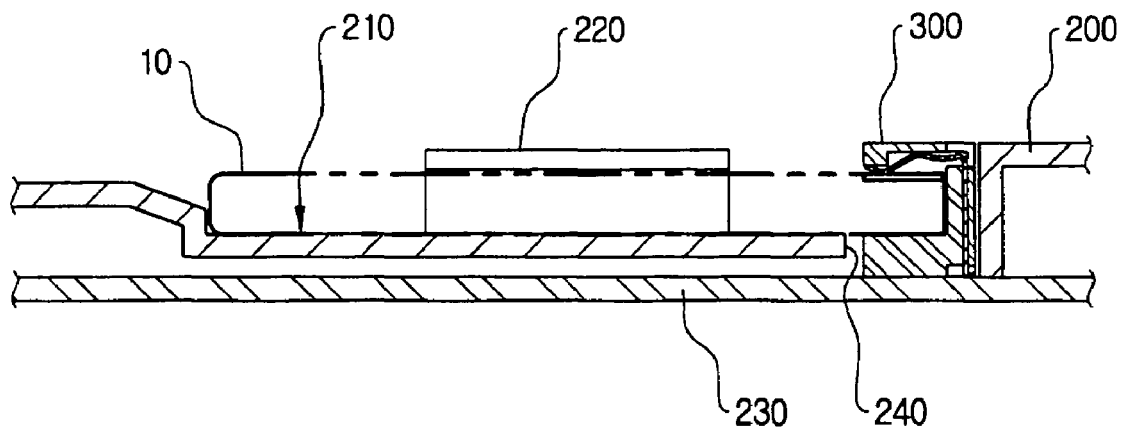
FIG. 8 shows a cross-section along a line A-A in FIG. 7.

As shown in FIG. 6, one end of the memory card 10 is advanced into entrance of the receiving recess 210 and simultaneously pushed-in below the guides 220 formed on both sides of the receiving recess 210. FIG. 7 and FIG. 8 show that the memory card 10 is completely mounted respectively.

Under a state that the memory card 10 is completely mounted in the recess, the terminal pins 14 of the memory card 10 are electrically connected to the socket 300. Such connection is extended to the main PCB 230. Accordingly, the mobile communication terminal and the memory card 10 are electrically connected to each other, so that it is possible to exchange information between them.

In such case, the guides 220 support the memory card 10 to maintain the mounted state stably, so that the memory card is not deviated contrary to a user's intention. In particular, since one end of the memory card 10 is inserted into the socket 300, the memory card is more stably supported.

Figure 9:
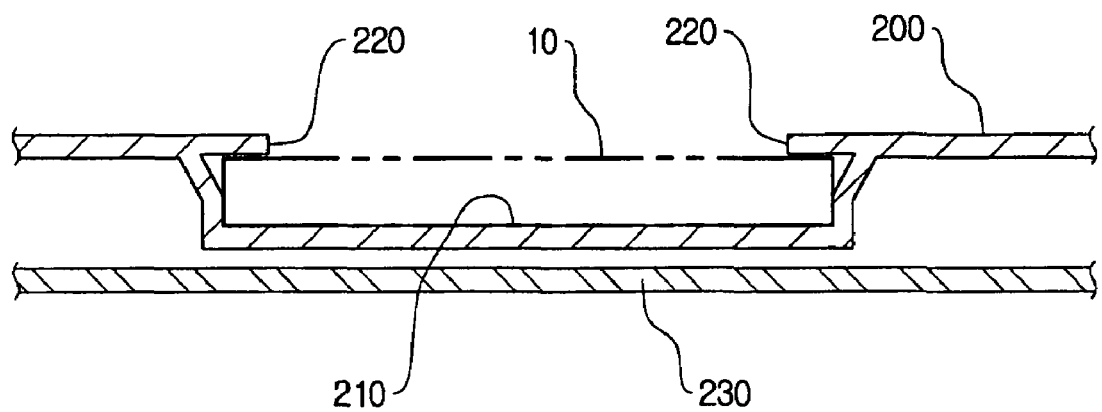
FIG. 9 shows a cross-section along a line B-B in FIG. 7.
Figure 10:
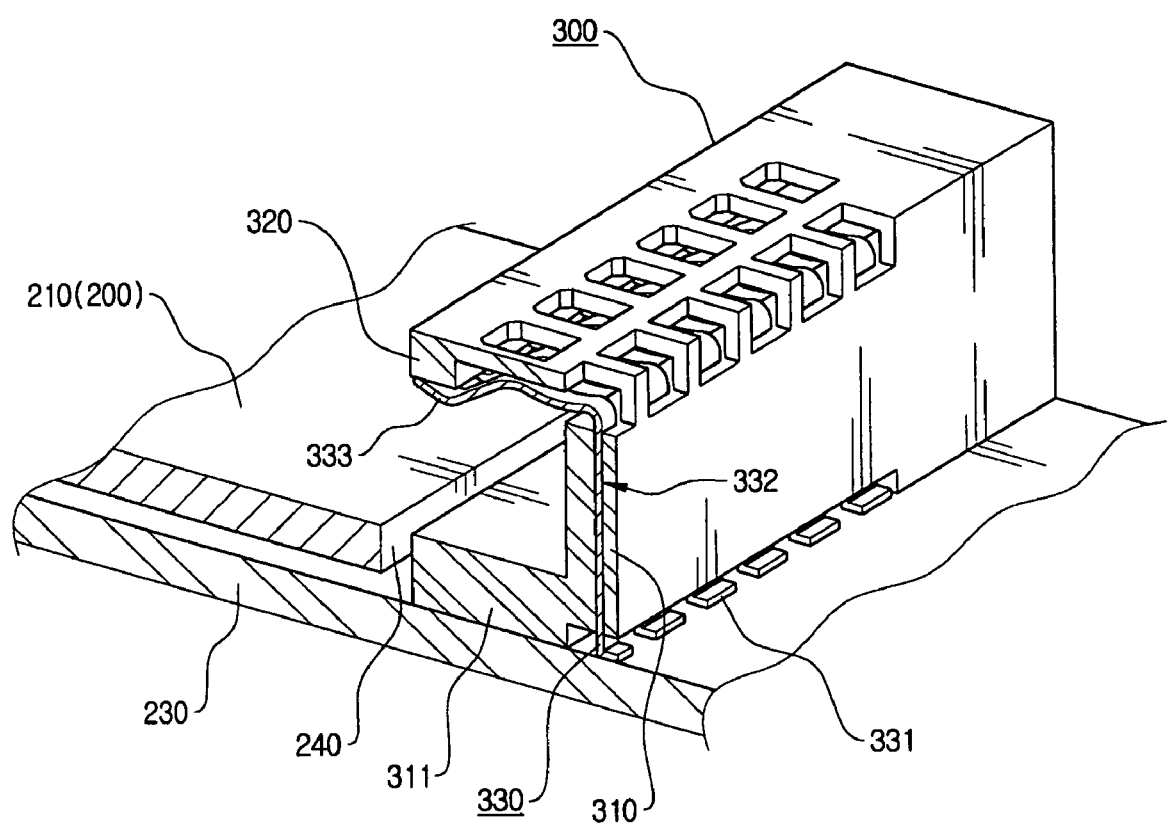
FIG. 10 shows an internal structure of a socket according to a preferred embodiment of the invention.

FIG. 9 is a view illustrating a state that the memory card 10 is completely received in the receiving recess 210 of the slide cover 200, and corresponding to a sectional view along a line B-B in FIG. 7.

As shown in FIG. 9, the memory card 10 is mounted in the receiving recess 210 formed on the rear surface of the slide cover 200. The guides 220 are formed on both sides of the receiving recess 210.

In the embodiment shown in FIG. 7, the guides 220 have a structure that they are integrally extended as a part of the slide cover 200. However, it is possible to provide the guides 220 to both sides of the receiving recess 210, as a separate component from the slide cover 200.

As shown in FIG. 10 to FIG. 13, the socket 300 according to the invention rests on the main PCB 230 and protrudes through the opening part 240 formed on the inner end of the receiving recess 210.

Specifically, the socket 300 comprises a sidewall part 310, a ceiling part 320 and plural contact terminals 330.

The sidewall part 310 is uprightly-mounted on the main PCB 230 of the slide cover 200. The ceiling part 320 is extended from the sidewall part 310 toward a memory card entrance of the receiving recess 210 and supports the contact terminals 330.

The contact terminals 330 are provided to correspond to numbers and positions of the terminal pins 140 of the memory card 10. One end of the contact terminal 330 is electrically connected to the main PCB 230, and the other end thereof is electrically connected to the terminal pin 140 of the memory card 10.

Specifically, each of the contact terminals 330 can be separated into a solder pad part 331, a column part 332 and a sliding contact part 333.

The solder pad part 331 is a part soldered on the main PCB 230, the column part 332 is a part that one side of the solder pad part 331 is uprightly extended, and the sliding-contact part 333 is an extended part from the upper column part 332 being bended to the entrance of the receiving recess 210. The solder pad part 331 may be soldered to the main PCB 230 by a known SMD (Surface Mount Device) technique.

Figure 11:
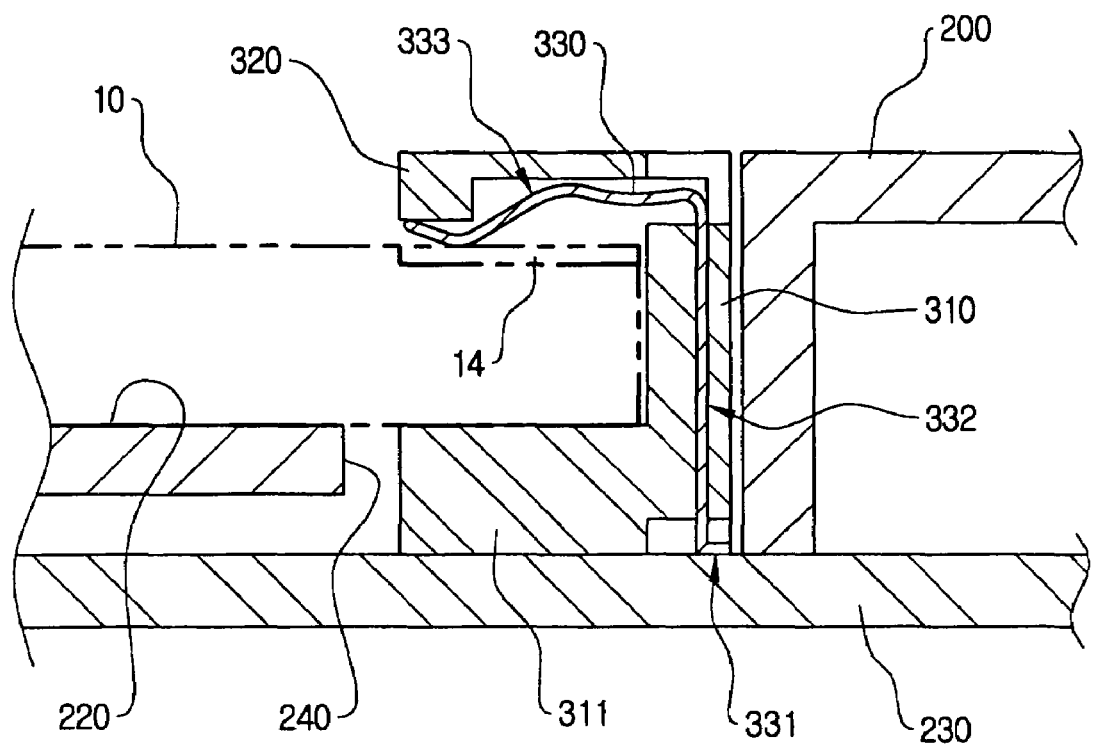
FIG. 11 shows a state that a memory card is inserted into the socket according to a preferred embodiment of the invention.
Figure 12:
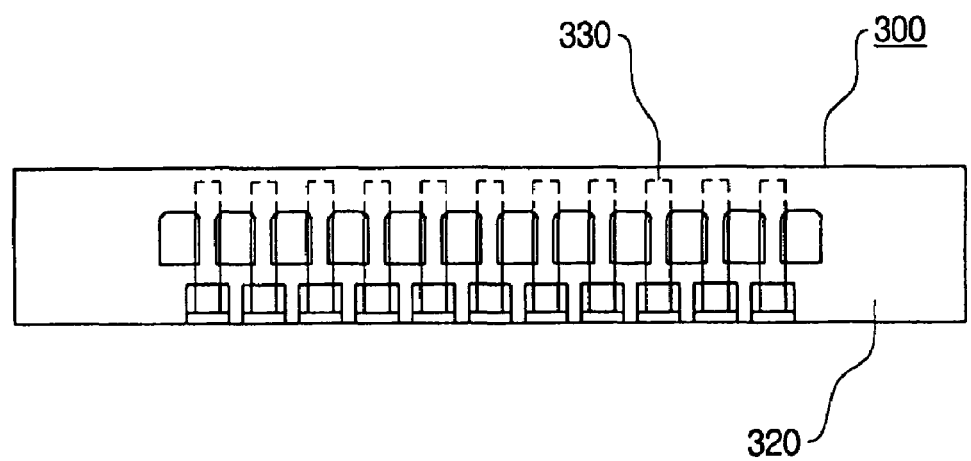
FIG. 12 shows a ceiling part of the socket.
Figure 13:
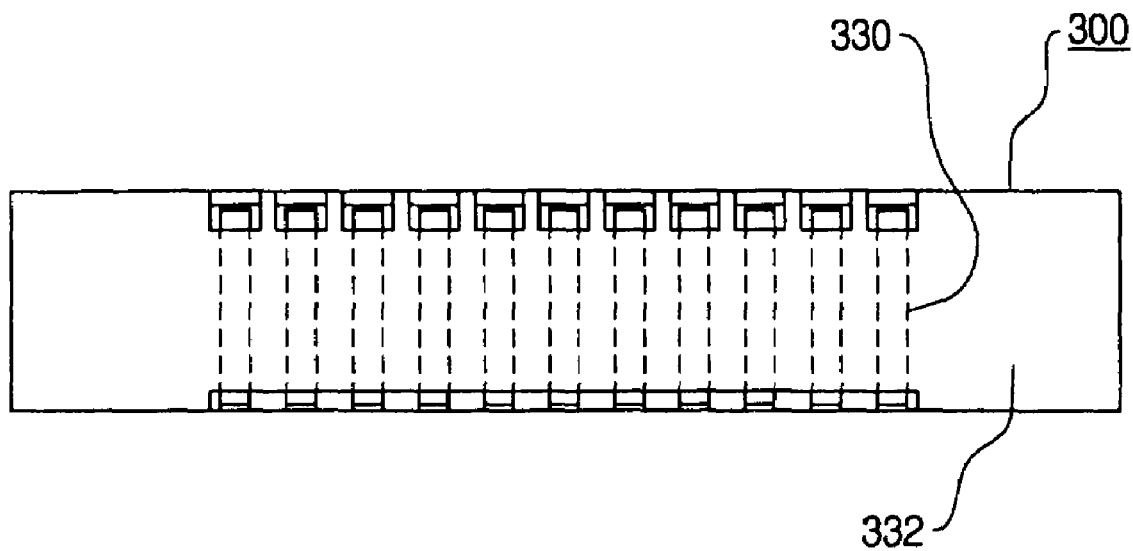
FIG. 13 shows a sidewall part of the socket.

As can be clearly seen from FIG. 11, the column part 332 is embedded in the sidewall part 310 and the terminal pins 14 of the memory card 10 are electrically connected to the sliding-contact part 333 extended from the column part 332 along the ceiling part 320.

The ceiling part 320 supports the sliding-contact part 333 and the memory card 10 is inserted tightly between the sliding-contact part 333 and the support part 311. The memory card 10, therefore, can maintain a stable mounting state by supporting of the sliding-contact part 333 and the support part 311 as shown in FIG. 11.

The socket 300 may further comprise a support part 311 that maintains stable connection between the terminal pins 14 of the memory card 10 and the sliding-contact part 333. The support part 311 of which lower part lies on the main PCB supports the column part 332 of the contact terminals 330.

In the above embodiment, the MINI SD card is described exemplarily regarding the memory card 10. However, it should be noted that other memory cards such as a SD card, a MMC card, a SM card and a Sony memory stick, etc. also can be used. These cards are different only with regard to sizes and the number of terminal pins.

Accordingly, a memory card can be applied in the same manner described in the above embodiments if a size of the receiving recess 210 or the number of the contact terminals 330 of the socket 300 is adjusted to correspond to a size or the number of terminal pins of the memory card.

As described above, according to the invention, the memory card is mounted to the rear surface of the slide cover of the slide-type mobile communication terminal, and the socket and guides adapted to the structure are also provided.

According to the invention, the receiving recess for mounting the memory card is formed in the rear surface of the sliding cover. Accordingly, the receiving recess and the memory card are exposed simply by pushing-up the sliding cover against the main body. As a result of that, it is possible to easily mount/detach the memory card and form the receiving recess for mounting the memory card without increasing the thickness of the sliding cover.

Further, according to the invention, since the socket as well as both guides support the memory card mounted in the receiving recess, it is possible to stably mount the memory card.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A slidable mobile communication terminal capable of mounting a memory card comprising:
   a receiving recess formed on a rear surface of a slide cover so as to mount an memory card; guides guiding an entry of the memory card and preventing the mounted memory card from deviating; and
   a socket connecting the memory card electronically with a main PCB which is contained in the slide cover,
wherein the receiving recess is formed on a rear surface of the slide cover, which is exposed to outside without facing a main body of the mobile communication terminal when the slide cover is entirely pushed-up against the main body.

2. The mobile communication terminal according to claim 1, wherein the receiving recess is formed to have a same depth as a thickness of the memory card or more.

3. The mobile communication terminal according to claim 1, wherein the socket comprises:
   a contact terminal of which one end is connected to the main PCB electronically and the other end is connected to terminal pin of the memory card electronically;
   a sidewall part supporting one side of the contact terminal; and
   a ceiling part supporting an upper surface of the contact terminal by extending from the sidewall part toward entrance of the receiving recess.

4. The mobile communication terminal according to claim 1, wherein each of the contact terminals comprises:
   a solder pad part soldered on the main PCB;
   a column part upward extending from one side of the solder pad part and embedded in the sidewall part; and
   a sliding-contact part contacting with terminal pins of the memory card by extending from the column part to the entrance of the receiving recess along the ceiling part.

5. The mobile communication terminal according to claim 1, wherein the socket further comprises a support part stabilizing the contact between the terminal pin of the memory card and the sliding-contact part of the contact terminal.

6. The mobile communication terminal according to claim 1, wherein the memory card is one of the MINI(SD(Mini Secure Digital) card, a SD card, a MMC (Multi Media Card), a SM (Smart Media) card and a Sony memory stick.

* * * * *